(12) United States Patent
Chen et al.

(10) Patent No.: US 10,803,338 B2
(45) Date of Patent: Oct. 13, 2020

(54) METHOD AND DEVICE FOR RECOGNIZING THE CHARACTER AREA IN A IMAGE

(71) Applicant: Baidu Online Network Technology (Beijing) Co., Ltd., Beijing (CN)

(72) Inventors: Xin Chen, Beijing (CN); Jianzhong Gao, Beijing (CN); Chengjun Lei, Beijing (CN); Dongxue Wu, Beijing (CN); Linlin Yang, Beijing (CN); Taoyuan Cheng, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 145 days.

(21) Appl. No.: 16/160,740

(22) Filed: Oct. 15, 2018

(65) Prior Publication Data

US 2019/0050662 A1 Feb. 14, 2019

Related U.S. Application Data

(63) Continuation of application No. PCT/CN2016/108419, filed on Dec. 2, 2016.

(30) Foreign Application Priority Data

Aug. 31, 2016 (CN) .......................... 2016 1 0794963

(51) Int. Cl.
*G06K 9/20* (2006.01)
*G06K 9/00* (2006.01)
(Continued)

(52) U.S. Cl.
CPC ....... *G06K 9/2054* (2013.01); *G06K 9/00456* (2013.01); *G06K 9/4638* (2013.01);
(Continued)

(58) Field of Classification Search
None
See application file for complete search history.

(56) References Cited

U.S. PATENT DOCUMENTS 6,148,102 A * 11/2000 Stolin .................. G06K 9/2018
358/462
6,701,010 B1 * 3/2004 Katsuyama ............ G06K 9/342
382/165
(Continued)

FOREIGN PATENT DOCUMENTS

CN 102314608 A 1/2012
CN 102831416 A 12/2012
(Continued)

OTHER PUBLICATIONS

Hiroki Tkanahashi et al.;"Extraction of Text Regions from a Scenery Image Using Color and Edge Features", vol. 56, No. 6, pp. 979-985.

*Primary Examiner* — Vikkram Bali
(74) *Attorney, Agent, or Firm* — Miller, Matthias & Hull LLP

(57) ABSTRACT

A method and apparatus for recognizing a character area in an image are provided. A specific embodiment of the method comprises: acquiring color values and position information of pixel points in a to-be-recognized image; clustering the pixel points based on the color values of the pixel points, the color values of the pixel points in each pixel point category being identical or similar; determining, for each category of clustered pixel points, outlines of connected regions including the pixel points in each category of pixel points, to obtain an outline set; and merging, based on the color values and the position information of the outlines in the outline set, the outlines, to obtain character areas in the image. The embodi-
(Continued)

ment has improved the accuracy of recognizing character lines in recognizing characters in an image.

9 Claims, 7 Drawing Sheets

(51) Int. Cl.
*G06T 7/50* (2017.01)
*G06T 7/73* (2017.01)
*G06K 9/46* (2006.01)
*G06K 9/62* (2006.01)

(52) U.S. Cl.
CPC ........... *G06K 9/4652* (2013.01); *G06K 9/622* (2013.01); *G06T 7/50* (2017.01); *G06T 7/73* (2017.01); *G06K 2209/01* (2013.01); *G06T 2207/10024* (2013.01); *G06T 2207/20221* (2013.01)

(56) References Cited

U.S. PATENT DOCUMENTS

| | | | | |
|---|---|---|---|---|
| 7,672,022 | B1* | 3/2010 | Fan | G06T 5/003 |
| | | | | 348/207.99 |
| 2008/0063276 | A1* | 3/2008 | Vincent | G06K 9/6218 |
| | | | | 382/182 |
| 2015/0294523 | A1* | 10/2015 | Smith | G07D 7/04 |
| | | | | 382/140 |
| 2017/0124719 | A1* | 5/2017 | Long | G06K 9/00456 |

FOREIGN PATENT DOCUMENTS

| | | |
|---|---|---|
| CN | 102930262 A | 2/2013 |
| CN | 103824073 A | 5/2014 |
| CN | 105740860 A | 7/2016 |
| JP | 1994187489 A | 8/1994 |
| JP | 2001283153 A | 10/2001 |
| JP | 2002236877 A | 8/2002 |
| JP | 2011248702 A | 12/2011 |

\* cited by examiner

METHOD AND DEVICE FOR RECOGNIZING THE CHARACTER AREA IN A IMAGE

CROSS-REFERENCE TO RELATED APPLICATIONS

This application is a continuation of International Application No. PCT/CN2016/108419, filed on Dec. 2, 2016, which claims priority to the Chinese Patent Application No. "201610794963.2," titled "Method and Apparatus for Recognizing Character Area in Image" and filed on Aug. 31, 2016. The disclosures of the aforementioned applications are hereby incorporated by reference in their entireties.

TECHNICAL FIELD

The disclosure relates to the field of computer technology, specifically to the field of pattern recognition technology, and more specifically to a method and apparatus for recognizing a character area in an image.

BACKGROUND

Optical Character Recognition (OCR), also known as character recognition, refers to a technology of recognizing characters in the image.

However, for recognizing images having mixed images and texts, complex typesetting and diverse styles, generally the existing character recognition technologies can only recognize character lines and characters, but can not determine the sequence between character lines. Assuming that the to-be-recognized image is as shown in FIG. 1, the common OCR system may determine that the sequence of recognized characters is from top to bottom and from left to right. Therefore, the sequence of the recognized characters in FIG. 1 is "title, first chapter, third chapter, second chapter, and fourth chapter." Actually, in the typesetting of the FIG. 1, the "first chapter" and the "second chapter" are consecutive, and the "third chapter" and the "fourth chapter" are consecutive.

Therefore, the existing character recognition technologies have the problem of an incorrect order of character lines in the recognition result.

SUMMARY

An object of the disclosure includes providing an improved method and apparatus for recognizing a character area in an image, to solve the technical problems mentioned in the background section.

In a first aspect, the disclosure provides a method for recognizing a character area in an image. The method includes: acquiring color values and position information of pixel points in a to-be-recognized image; clustering the pixel points based on the color values of the pixel points, the color values of the pixel points in each category of the clustered pixel points being identical or similar; determining, for each category of the clustered pixel points, outlines of connected regions including the pixel points in each category, to obtain an outline set; and merging, based on the color values and the position information of the outlines in the outline set, the outlines, to obtain character areas in the image.

In some embodiments, the position information includes a horizontal coordinate and a longitudinal coordinate; and the merging, based on the color values and the position information of the outlines in the outline set, the outlines, to obtain character areas in the image includes: merging, for the outlines in a given line, outlines having identical or similar color values and a first horizontal distance therebetween smaller than or equal to a first predetermined threshold, to obtain a set of character lines; and merging, for the character lines in the set, the character lines in the set based on the color values, longitudinal coordinates, and horizontal coordinates of the character lines in the set, to obtain the character areas in the image.

In some embodiments, the merging, for the character lines in the set, the character lines in the set based on the color values, the longitudinal coordinates, and the horizontal coordinates of the character lines in the set, to obtain the character areas in the image includes: calculating a longitudinal distance between longitudinally adjacent character lines and a second horizontal distance between minimum horizontal coordinates of the adjacent character lines; and merging character lines having identical color values, the longitudinal distance smaller than or equal to a second predetermined threshold, and the second horizontal distance smaller than or equal to a third predetermined threshold, to obtain the character areas in the image.

In some embodiments, the method further includes: determining circumscirbed rectangles of the outlines, color values of the circumscirbed rectangles being color values of corresponding outlines, the position information of the circumscirbed rectangle being vertex coordinates of four sides of the corresponding outline; and the merging, based on the color values and the position information of the outlines in the outline set, the outlines, to obtain character areas in the image includes: merging, based on the color values and the position information of the circumscirbed rectangles of the outlines, the circumscirbed rectangles, to obtain character areas in the image.

In some embodiments, before the merging, based on the color values and the position information of the outlines in the outline set, the outlines, to obtain character areas in the image, the method further includes: removing outlines having a longitudinal height greater than a fourth predetermined threshold from the outlines based on longitudinal coordinate information of the outlines.

In second aspect, the disclosure provides a method for recognizing a character in an image. The method includes: recognizing characters in recognized character areas in a to-be-recognized image respectively, to obtain character recognition results, the character areas in the to-be-recognized image being obtained by the method according to any one of claims 1 to 5; and aggregating the obtained character recognition result.

In a third aspect, the disclosure provides an apparatus for recognizing a character area in an image. The apparatus includes: an acquisition unit, configured for acquiring color values and position information of pixel points in a to-be-recognized image; a clustering unit, configured for clustering the pixel points based on the color values of the pixel points, the color values of the pixel points in each category of the clustered pixel points being identical or similar; an outline determining unit, configured for determining, for each category of the clustered pixel points, outlines of connected regions including the pixel points in each category, to obtain an outline set; and a character area generation unit, configured for merging, based on the color values and the position information of the outlines in the outline set, the outlines, to obtain character areas in the image.

In some embodiments, the position information includes a horizontal coordinate and a longitudinal coordinate; and the character area generation unit includes: a character line generation module, configured for merging, for the outlines in a given line, outlines having identical or similar color values and a first horizontal distance therebetween smaller than or equal to a first predetermined threshold, to obtain a set of character lines; and a character area generation module, configured for merging, for the character lines in the set, the character lines in the set based on the color values, longitudinal coordinates, and horizontal coordinates of the character lines in the set, to obtain the character areas in the image.

In some embodiments, the character area generation module includes: a calculation submodule, configured for calculating a longitudinal distance between longitudinally adjacent character lines and a second horizontal distance between minimum horizontal coordinates of the adjacent character lines; and a merging submodule, configured for merging character lines having identical color values, the longitudinal distance smaller than or equal to a second predetermined threshold, and the second horizontal distance smaller than or equal to a third predetermined threshold, to obtain the character areas in the image.

In some embodiments, the apparatus further includes: a circumscribed rectangle determining unit, configured for determining circumscirbed rectangles of the outlines, color values of the circumscirbed rectangles being color values of corresponding outlines, the position information of the circumscirbed rectangle being vertex coordinates of four sides of the corresponding outline; and the character area generation unit being further configured for: merging, based on the color values and the position information of the circumscirbed rectangles of the outlines, the circumscirbed rectangles, to obtain the character areas in the image.

In some embodiments, the apparatus further includes: a deletion unit, configured for removing outlines having a longitudinal height greater than a fourth predetermined threshold from the outlines based on longitudinal coordinate information of the outlines.

In a fourth aspect, the disclosure provides an apparatus for recognizing a character in an image. The apparatus includes: a character area recognition unit, including the apparatus for recognizing a character area in an image according to any one of claims 7 to 11; a character area recognition unit, configured for recognizing characters in recognized character areas in a to-be-recognized image respectively, to obtain character recognition results; and an aggregation unit, configured for aggregating the obtained character recognition results.

In a fifth aspect, the disclosure provides a computer system. The computer system includes: a memory, configured for storing executable instructions; and one or more processors, configured for communicating with the memory to execute the executable instructions to complete the method for recognizing a character area in an image.

In a sixth aspect, the disclosure provides a computer system. The computer system includes: a memory, configured for storing executable instructions; and one or more processors, configured for communicating with the memory to execute the executable instructions to complete following operation: recognizing characters in recognized character areas in a to-be-recognized image respectively, to obtain character recognition results, the character areas in the to-be-recognized image being obtained by the method for recognizing a character area in an image; and aggregating the obtained character recognition results.

In a seventh aspect, the disclosure provides a non-volatile computer storage medium, the computer storage medium storing computer readable instructions executable by a processor, the processor completing the method for recognizing a character area in an image when the computer readable instructions are executed by the processor.

In an eighth aspect, the disclosure provides a non-volatile computer storage medium, the computer storage medium storing computer readable instructions executable by a processor, the processor completing following operations when the computer readable instructions are executed by the processor: recognizing characters in recognized character areas in a to-be-recognized image respectively, to obtain character recognition results, the character areas in the to-be-recognized image being obtained by the method for recognizing a character area in an image; and aggregating the obtained character recognition results.

The method and apparatus for recognizing a character area in an image provided by the disclosure acquire color values and position information of pixel points in a to-be-recognized image, then cluster the pixel points based on the color values of the pixel points, then determine, for each category of clustered pixel points, outlines of connected regions including the pixel points in each category, to obtain an outline set, and finally merge, based on the color values and the position information of outlines in the outline set, the outlines, to obtain character areas in the image, thereby effectively recognizing the character areas using the color values and the position information of the pixel points. Furthermore, the method and apparatus for recognizing a character in an image provided by the disclosure may pre-acquire a character area in an image by the method and apparatus for recognizing a character area in an image, then recognize characters in character areas, and aggregate recognition results of the character areas, thereby guaranteeing a correct order of character lines in recognizing characters in the image.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
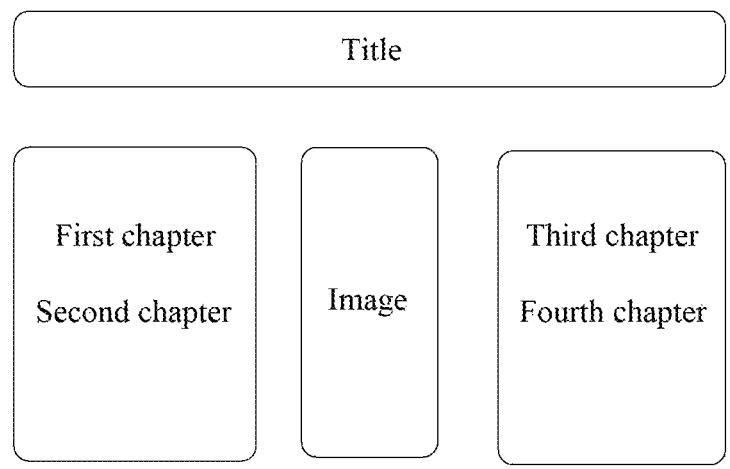
FIG. 1 is a schematic diagram of a to-be-recognized image.
Figure 2:
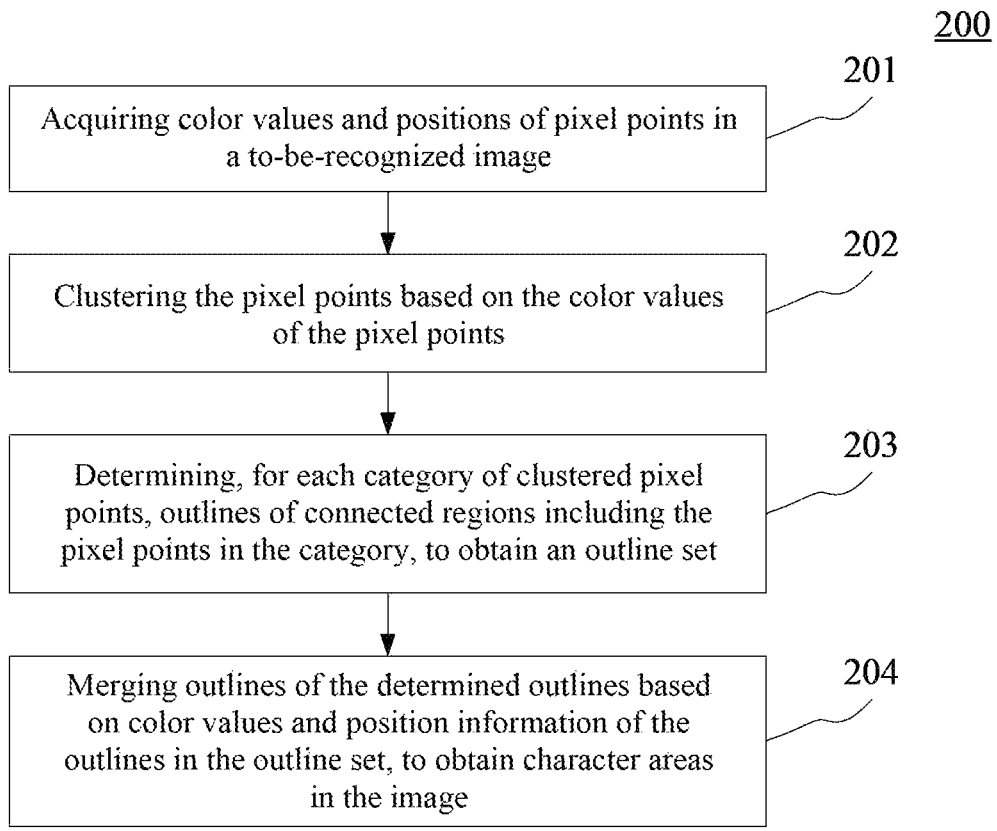
FIG. 2 is a flow chart of an embodiment of a method for recognizing a character area in an image according to the disclosure.

Reference is made to FIG. 2, which shows a flow 200 of an embodiment of a method for recognizing a character area in an image according to the disclosure. The method for recognizing a character area in an image includes steps 201 to 204.

Step 201 includes acquiring color values and position information of pixel points in a to-be-recognized image.

In the embodiment, an electronic device in which the method for recognizing a character area in an image is implemented may first acquire the to-be-recognized image. The to-be-recognized image may be, but is not limited to, an image file in a format, such as jpg, bmp, tif, gif, or png. The to-be-recognized image may be a screenshot. Then, the electronic device may acquire the color values and the position information of pixel points in the to-be-recognized image.

In the embodiment, the color value of each pixel point in the to-be-recognized image may be a color value using various color expression methods, such as a color value of a RGB (Red Green Blue) color pattern, or a color value of a HSV (Hue-Saturation-Value) color model, or a gray value.

In some optional implementations of the embodiment, the position information of each pixel point in the to-be-recognized image may include a horizontal coordinate and a longitudinal coordinate of the pixel point. As an example, the position information of each pixel point in the to-be-recognized image may include a horizontal coordinate and a longitudinal coordinate with a coordinate origin being the top left corner of the to-be-recognized image.

Step 202 includes clustering the pixel points based on the color values of the pixel points.

In the embodiment, the electronic device may cluster the pixel points based on the color values of the pixel points acquired in the step 201, to obtain at least two categories of the pixel points, the color values of the pixel points in each category being identical or similar. Each category corresponds to one color value of the clustered pixel points.

In the embodiment, the method for clustering the pixel points in the image may be clustering algorithms, such as a Kmeans algorithm, a K-MEDOIDS algorithm, and a CLARANS algorithm.

It should be noted that the clustering methods are well-known technologies that are widely researched and applied at present, and are not repeated any more here.

Step 203 includes determining, for each category of clustered pixel points, outlines of connected regions including the clustered pixel points in the category, to obtain an outline set.

In the embodiment, the electronic device may determine, for each category of clustered pixel points, the outlines of connected regions including the pixel points in the category, to obtain the outline set. Here, the outline includes a color value and position information. The color value of the outline is a color value of a category of pixel points forming the outline, and the position information of the outline includes position information of pixel points forming the outline.

In the embodiment, the outline of the connected region may be determined using various outline recognition methods, such as a Snake model, a Sobel operator, a Robert operator, a Laplancian operator, a Prewitt operator, or a Canny operator.

It should be noted that the outline recognition methods are well-known technologies that are widely researched and applied at present, and are not repeated any more here.

Step 204: merging, based on the color values and the position information of the outlines in the outline set, the outlines, to obtain character areas in the image.

In some optional implementations of the embodiment, in the outline set, outlines having identical or similar color values, a first horizontal distance therebetween smaller than or equal to a fifth predetermined threshold (e.g., a quarter of a sum of heights of two outlines), and a longitudinal distance therebetween smaller than or equal to a sixth predetermined threshold (e.g., a half of the sum of heights of the two outlines) may be merged, to obtain a set of character areas.

It should be noted that the first horizontal distance between two outlines in the disclosure refers to a difference acquired by subtracting a maximum value of horizontal coordinates of the position information of an outline having a smaller maximum value of the horizontal coordinates from a minimum value of horizontal coordinates of the position information of an outline having a greater maximum value of the horizontal coordinates. The longitudinal distance between two outlines refers to a difference acquired by subtracting a maximum value of longitudinal coordinates of the position information of an outline having a smaller maximum value of the longitudinal coordinates from a minimum value of longitudinal coordinates of the position information of an outline having a greater maximum value of the longitudinal coordinates.

In some optional implementations of the embodiment, first, for outlines in a given line, outlines having identical or similar color values and the first horizontal distance smaller than or equal to the first predetermined threshold (e.g., a quarter of a sum of heights of two outlines) may be merged, to obtain a set of character lines; and then, for the set of character lines, character lines in the set may be merged based on the color values, the longitudinal coordinates, and the horizontal coordinates of the character lines in the set, to obtain character areas in the image. Here, whether the two outlines belong to a given line may be determined in a following way: if a difference between maximum values of longitudinal coordinates of position information of the two outlines is smaller than a seventh predetermined threshold (e.g., 2 pixels), and a difference between minimum values of the longitudinal coordinates of the position information of the two outlines is smaller than an eighth predetermined threshold (e.g., 2 pixels), then the two outlines belonging to the given line may be determined.

In some optional implementations of the embodiment, the merging, for the character lines in the set, character lines in the set based on the color values, the longitudinal coordinates, and the horizontal coordinates of the character lines in the set, to obtain the character areas in the image may include: first, calculating a longitudinal distance between longitudinally adjacent character lines and a second horizontal distance between minimum horizontal coordinates of the adjacent character lines; and then, merging character lines having an identical color values, a longitudinal distance smaller than or equal to a second predetermined threshold (e.g., a half of a sum of line heights of two character lines), and a second horizontal distance smaller than or equal to a third predetermined threshold (e.g., the sum of the line heights of the two character lines), to obtain the character areas in the image. Based on the above steps, character lines having adjacent longitudinal coordinates may be merged while the first line indent may be considered.

In some optional implementations of the embodiment, the merging, for the character lines int the set, character lines in the set based on the color values, the longitudinal coordinates, and the horizontal coordinates of the character lines in set, to obtain the character areas in the image may also include: first, calculating a longitudinal distance between longitudinally adjacent character lines and a third horizontal distance between maximum horizontal coordinates of the adjacent character lines; and then, merging character lines having identical color values, a longitudinal distance smaller than or equal to a second predetermined threshold (e.g., a half of a sum of line heights of two character lines), and a third horizontal distance smaller than or equal to a ninth predetermined threshold (e.g., twice the sum of the line heights of the two character lines), to obtain the character areas in the image. Based on the above steps, character lines having adjacent longitudinal coordinates may be merged, and the case that there is no character at an end of the last line of the character may be considered.

In some optional implementations of the embodiment, before the step 204, the method may further include: removing an outline having a longitudinal height greater than a fourth predetermined threshold (e.g., 100 pixels) from the outlines based on longitudinal coordinate information of the outlines. Since the to-be-recognized image may include a background area, an illustration area, and a character area, outlines of the background area and the illustration area may be removed from the outline set through this step.

In some optional implementations of the embodiment, before the step 204, the method may further include: determining circumscirbed rectangles of the outlines. A color value of the circumscirbed rectangle is a color value of a corresponding outline, and the position information of the circumscirbed rectangle is vertex coordinates of four sides of the corresponding outline. Thus, the merging, based on the color values and the position information of outlines in the outline set, the outlines, to obtain character areas in the image may include: merging, based on the color values and the position information of the circumscirbed rectangles of the outlines, the circumscirbed rectangles, to obtain character areas in the image. Here, to obtain character areas in the images, based on the color values and the position information of the circumscirbed rectangles of outlines, the circumscirbed rectangles may be merged by: first, merging the circumscirbed rectangles of the outlines, to form a set of character line rectangles, where the color value of the circumscirbed rectangle of the outline is identical to the color value of the outline, and a color value of the character line rectangle is identical to the color value of the circumscirbed rectangles merged into the character line rectangle; and then, merging the character line rectangles to form the character areas, where a color value of the character area is identical to the color value of the character line rectangles merged into the character area.

In some optional implementations of the embodiment, circumscirbed rectangles meeting following condition among the circumscirbed rectangles of the outlines may be merged into a character line rectangle: color values of two circumscirbed rectangles are identical, a first horizontal distance between the two circumscirbed rectangles is smaller than or equal to a tenth predetermined threshold (e.g., a quarter of a sum of heights of the two circumscirbed rectangles), a difference between maximum values of longitudinal coordinates of the two circumscribed rectangles is smaller than or equal to an eleventh predetermined threshold (e.g., 2 pixels), and a difference between minimum values of the longitudinal coordinates of the two circumscribed rectangles is smaller than or equal to a twelfth predetermined threshold (e.g., 2 pixels).

In some optional implementations of the embodiment, circumscirbed rectangles meeting following condition among the circumscirbed rectangles of the outlines may be merged into a character line rectangle: color values of two circumscirbed rectangles are identical, a first horizontal distance between the two circumscirbed rectangles is smaller than or equal to a thirteenth predetermined threshold (e.g., a quarter of a sum of heights of the two circumscirbed rectangles), and a distance between the minimum coordinate and the maximum coordinate of overlapping longitudinal coordinates of the two circumscirbed rectangles is greater than a fourteenth predetermined threshold (e.g., a quarter of the sum of the heights of the two circumscirbed rectangles).

In some optional implementations of the embodiment, circumscirbed rectangles meeting following condition among the circumscirbed rectangles of the outlines may be merged into a character line rectangle: color values of two circumscirbed rectangles are identical, a first horizontal distance between the two circumscirbed rectangles is smaller than a fifteenth predetermined threshold (e.g., a quarter of a sum of heights of the two circumscirbed rectangles), and for the two circumscribed rectangles, one has a greater minimum value and a smaller maximum value of the longitudinal coordinate than those of the longitudinal coordinate of the other one.

In some optional implementations of the embodiment, two circumscirbed rectangles having an intersection in a circumscirbed rectangle set may be merged into a character line rectangle.

In some optional implementations of the embodiment, the merging the character line rectangles to form the character areas may include steps as follows.

First, character line identifiers for the character line rectangles are generated.

Then, for the character line rectangles, character areas corresponding to the character line rectangles are generated. The character area includes: coordinates of four vertexes of the rectangle of character area, the color value, the line height, line spacing, and character line identifier linked list.

Then, for each character area, the coordinates of the four vertexes, the color value, and the line height of the character area may be respectively set as the coordinates of the four vertexes, and the color value of the character line rectangle corresponding to the character area, and a difference between a maximum value and a minimum value of the longitudinal coordinates of the coordinates of four vertexes of the character line rectangle, an element is added to the character line identifier linked list of the character area, and a value of the element is set as the character line identifier of the character line rectangle corresponding to the character area.

Then, merging is performed by: finding two character areas meeting all conditions in a following condition group from the character areas: color values of the two character areas are identical, a difference between line heights of the two character areas is smaller than or equal to a sixteenth predetermined threshold (e.g., 2 pixels), a vertical distance between the two character areas is smaller than or equal to a seventeenth predetermined threshold (for example, 2 pixels), both the vertical distance between the two character areas and a difference between line spacings of the two character areas are smaller than or equal to an eighteenth predetermined threshold (e.g., 2 pixels), a second horizontal distance between the two character areas is smaller than or equal to a nineteenth predetermined threshold (e.g., twice a sum of the line heights of the two character areas), and/or a third horizontal distance between the two character areas is smaller than or equal to a twentieth predetermined threshold (e.g., twice the sum of the line heights of the two character lines); merging the two character areas into a new character area, setting coordinates of four vertexes of a smallest circumscribed rectangle of the two character areas as coordinates of four vertexes of the new character area, setting a line height of the new character area based on the line heights of the two character areas (e.g., setting an average line height of the two character areas as the line height of the new character area), and setting a line spacing of the new character area based on line spacings of the two character areas (e.g., setting an average line spacing of the two character areas as the line spacing of the new character area); setting a color value of the new character area based on color values of the two character areas, merging character line identifier linked lists of the two character areas, and setting a character line identifier linked list of the new character area based on the merged character line identifier linked list; using the merged new character area and unmerged character area of the character areas as new character areas; determining whether the new character areas include two character areas meeting all conditions in the above condition group; using the new character areas as a final recognition result if the new character areas do not include two character areas meeting all conditions in the above condition group; and the merging steps is performed on the new character area, if the new character areas include two character areas meeting all conditions in the above condition group.

Figure 3A:
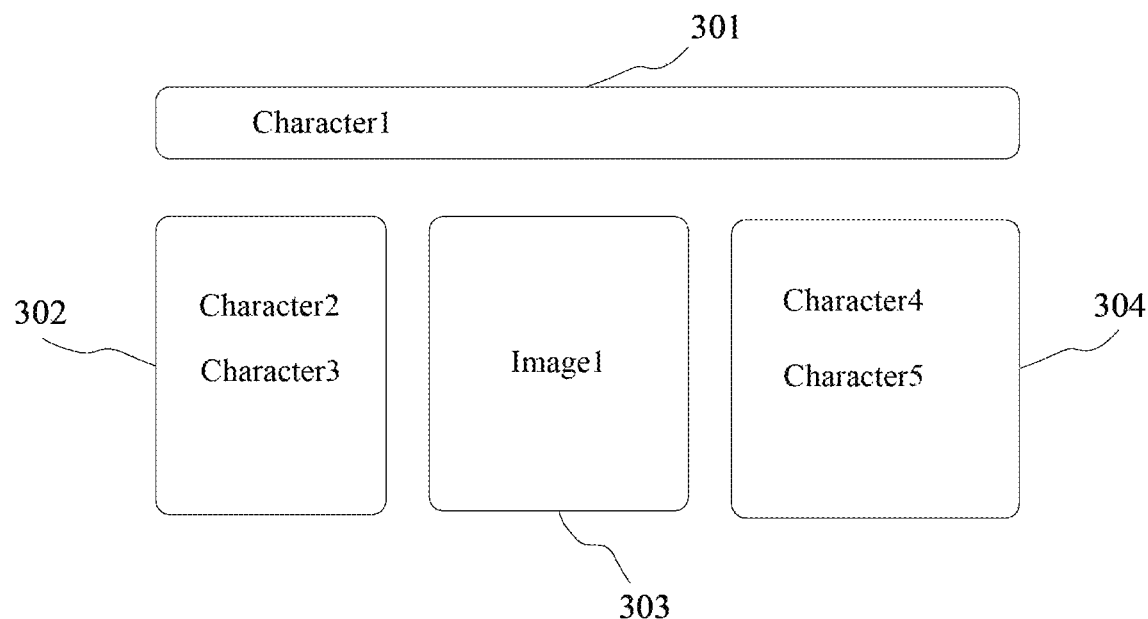
FIG. 3a-FIG. 3c are schematic diagrams of application scenarios of a method for recognizing a character area in an image according to the disclosure.
Figure 3B:
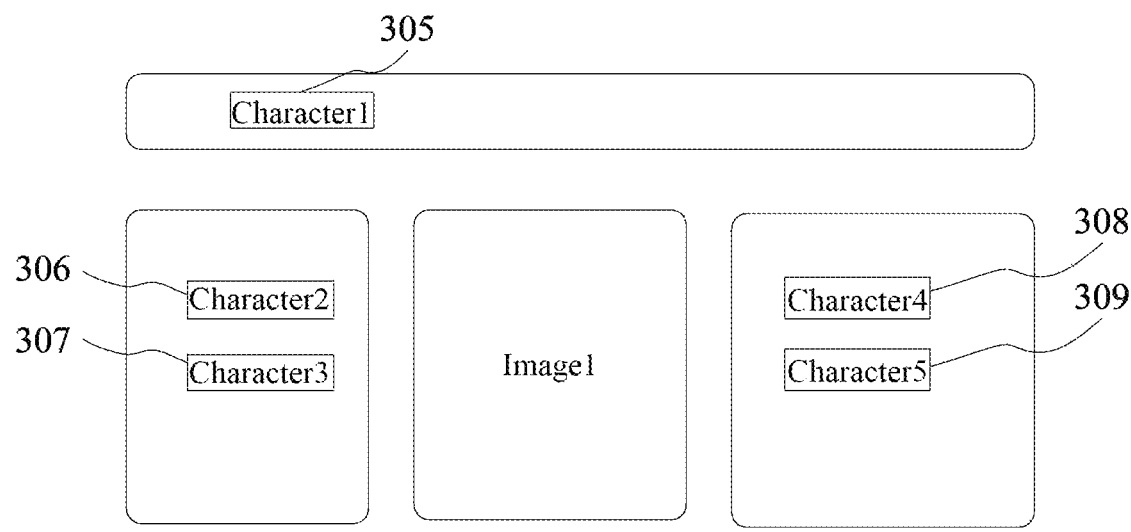
Figure 3C:
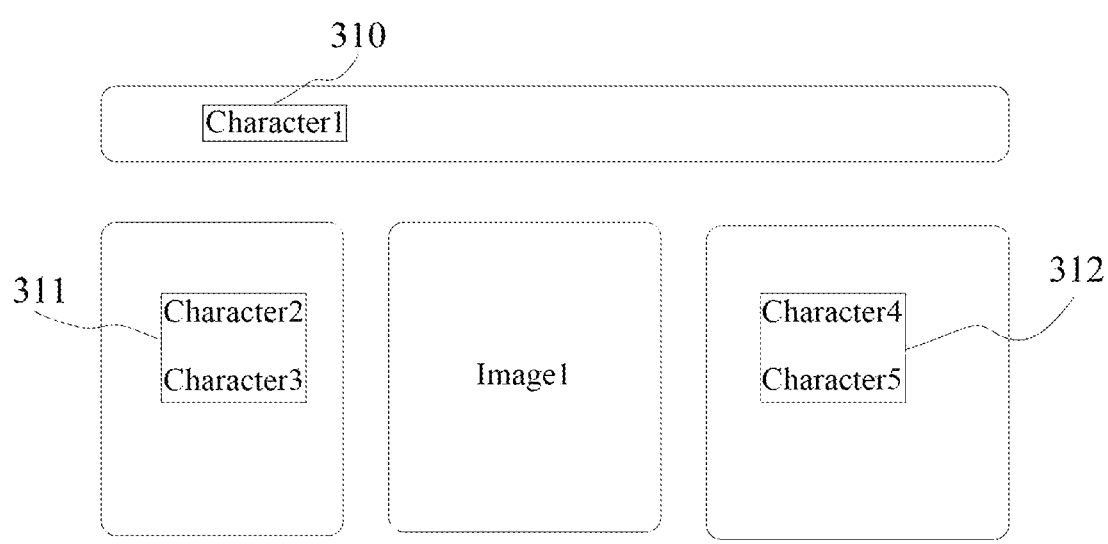

Further reference is made to FIG. 3a-FIG. 3c. which are schematic diagrams of an application scenario of a method for recognizing a character area in an image according to the embodiment. In the application scenario of FIG. 3, a to-be-recognized image is as shown in FIG. 3a. The whole image includes four parts, a first part in a first line includes characters in a line (as shown by an icon 301 in FIG. 3a), a leftmost second part in a second line includes "character 2" and "character 3" (as shown by an icon 302 in FIG. 3a), an image in the middle of the second line is a third part (as shown by an icon 303 in FIG. 3a), and a rightmost fourth part in the second line includes "character 4" and "character 5" (as shown by an icon 304 in FIG. 3a). A common character recognition system may recognize the sequence of the characters in an order from top to bottom and from left to right. Therefore, the recognized sequence of character line may be "character 1 character 2 character 4 character 3 character 5", but actually, in the typesetting of the original figure, the "character 2" and the "character 3" are consecutive, and the "character 4" and the "character 5" are consecutive. Therefore, a common character recognition system may incorrectly recognize the order of character lines. Based on the characteristics of such images, according to the method for recognizing a character area in an image according to the disclosure, character lines, such as five character lines shown by icons 305, 306, 307, 308, and 309 in FIG. 3b, in an image are first recognized, and then the character lines are merged to obtain three character areas shown by icons 310, 311, and 312 in FIG. 3c. Based on FIG. 3c, character recognitions are performed on characters areas shown by the icons 310, 311, and 312 respectively, and then recognition results of the character areas are aggregated to obtain a correct order of the recognized characters.

The method according to the embodiment of the disclosure pre-recognizes a character area in a to-be-recognized image by clustering the to-be-recognized image, performing an outline recognition on the to-be-recognized image, and generating a character area on the to-be-recognized image, and then separately recognizes characters indifferent character areas, thereby guaranteeing a correct order of character lines in recognizing characters in the image.

Figure 4:
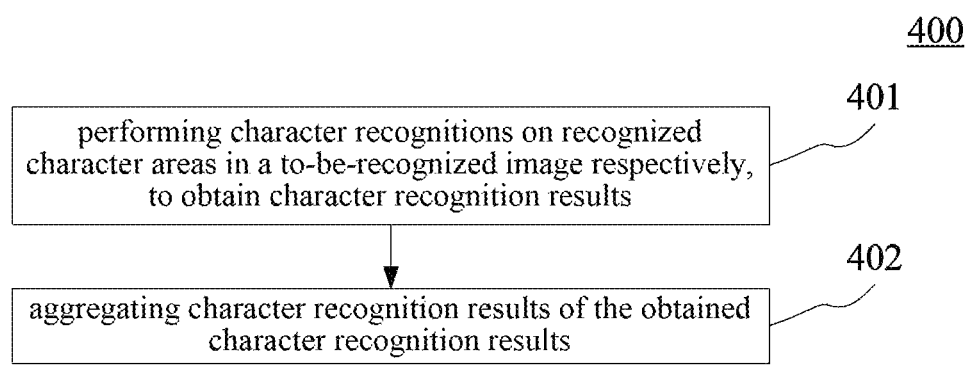
FIG. 4 is a flow chart of an embodiment of a method for recognizing a character in an image according to the disclosure.

Further reference is made to FIG. 4, which shows a flow 400 of an embodiment of a method for recognizing a character in an image. The flow 400 of a method for recognizing a character in an image includes steps 401 and 402.

Step 401 includes: performing character recognitions on recognized character areas in the to-be-recognized image respectively, to obtain character recognition results.

In the embodiment, the character areas in the to-be-recognized image may be obtained by the method for recognizing a character area in an image as shown in FIG. 2.

In some optional implementations of the embodiment, each character line in the character areas of the to-be-recognized image may be segmented into character subblocks, and then the character recognition is performed on each of the character subblocks. Each character subblock may be recognized by first extracting a characteristic of the character subblock, and then comparing the extracted characteristic with a character characteristic in a pre-trained character library, and providing a comparing result. The characteristic here may be simply distinguished into two categories: one category of characteristics is statistical characteristics, such as a ratio of a number of black points to a number of white points in a character area; and the other category of characteristics is structural characteristics, such as a stroke endpoint of a word, a number and position of intersection points, or a stroke segment, or the like.

It should be noted that the methods for recognizing a character in a character area are well-known technologies that are widely researched and applied at present, and are not repeated any more here.

Step 402 includes: aggregating the obtained character recognition results.

In the embodiment, the character recognition results obtained in the step 401 may be aggregated based on the character areas of the character recognition results, and finally the aggregated character recognition results of the to-be-recognized image is obtained.

Figure 5:
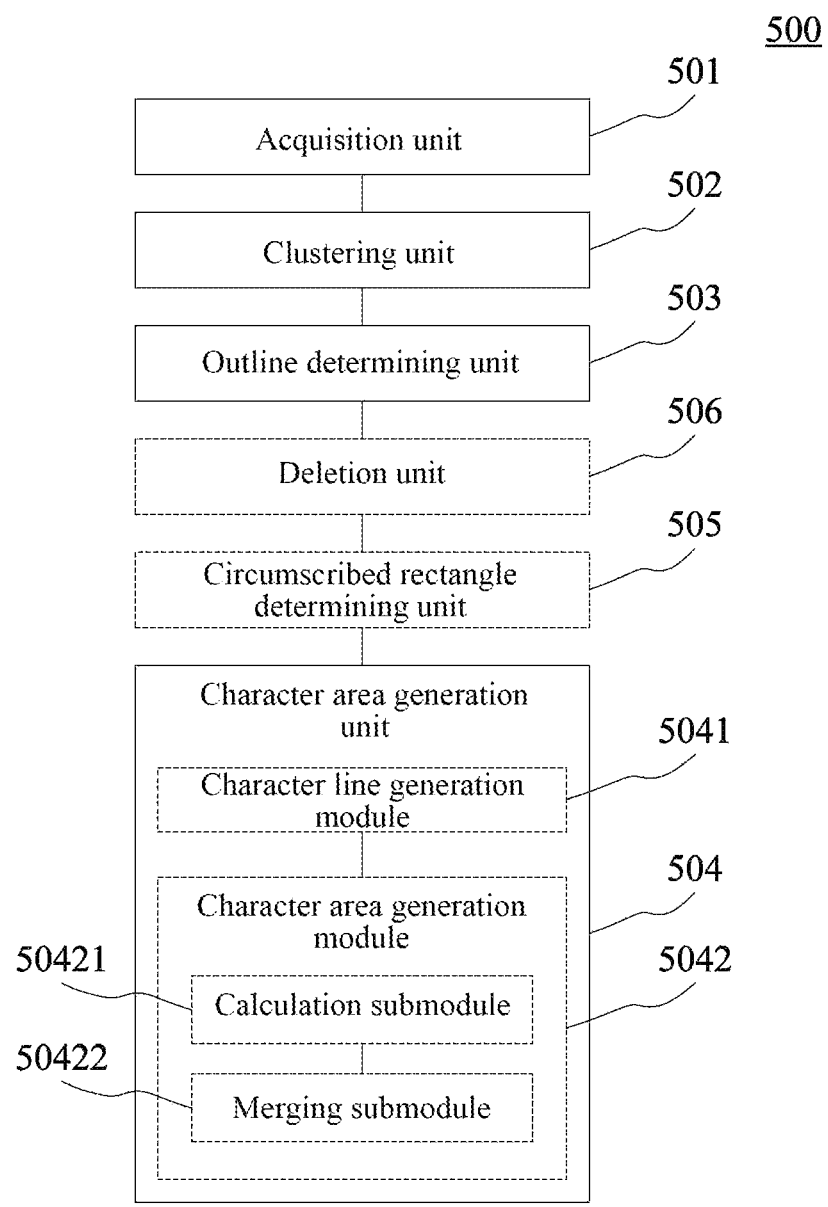
FIG. 5 is a schematic structural diagram of an embodiment of an apparatus for recognizing a character area in an image according to the disclosure.

Further reference is made to FIG. 5. As an implementation of the method shown in the above figures, the disclosure provides an embodiment of an apparatus for recognizing a character area in an image. The embodiment of the apparatus corresponds to the embodiment of the method shown in FIG. 2. The apparatus may be specifically applied to a variety of electronic devices.

As shown in FIG. 5, an apparatus 500 for recognizing a character area in an image according to the embodiment includes: an acquisition unit 501, a clustering unit 502, an outline determining unit 503, and a character area generation unit 504. The acquisition unit 501 is configured for acquiring color values and position information of pixel points in a to-be-recognized image; the clustering unit 502 is configured for clustering the pixel points based on the color values of the pixel points, the color values of the pixel points in each category of the clustered pixel points being identical or similar; the outline determining unit 503 is configured for determining, for each category of the clustered pixel points, outlines of connected regions including the pixel points in the category, to obtain an outline set; and the character area generation unit 504 is configured for merging, based on the color values and the position information of outlines in the outline set, the outlines, to obtain character areas in the image.

Relevant descriptions on the steps 201, 202, 203 and 204 in the embodiment corresponding to FIG. 2 may respectively refer to specific processing of the acquisition unit 501, the clustering unit 502, the outline determining unit 503, and the character area generation unit 504 of the apparatus 500 for recognizing a character area in an image according to the embodiment, which are not repeated any more here.

In some optional implementations of the embodiment, the position information may include a horizontal coordinate and a longitudinal coordinate; and the character area generation unit 504 may include: a character line generation module 5041, configured for merging, for outlines in a given line, outlines having identical or similar color values and a first horizontal distance therebetween smaller than or equal to a first predetermined threshold, to obtain a set of character lines; and a character area generation module 5042, configured for merging, for the set of character lines, the character lines in the set based on the color values, the longitudinal coordinates, and the horizontal coordinates of the character lines in the set, to obtain the character areas in the image.

In some optional implementations of the embodiment, the character area generation module 5042 may include: a calculation submodule 50421, configured for calculating a longitudinal distance between longitudinally adjacent character lines and a second horizontal distance between minimum horizontal coordinates of the adjacent character lines; and a merging submodule 50422, configured for merging character lines having identical color values, a longitudinal distance smaller than or equal to a second predetermined threshold, and a second horizontal distance smaller than or equal to a third predetermined threshold, to obtain the character areas in the image.

In some optional implementations of the embodiment, the apparatus 500 for recognizing a character area in an image may further include: a circumscribed rectangle determining unit 505, configured for determining circumscirbed rectangles of the outlines, color values of the circumscirbed rectangles being color values of corresponding outlines, the position information of the circumscirbed rectangle being vertex coordinates of four sides of the corresponding outline; and the character area generation unit 504 is further configured for: merging, based on the color values and the position information of the circumscirbed rectangles of the outlines, the circumscirbed rectangles, to obtain character areas in the image.

In some optional implementations of the embodiment, the apparatus 500 for recognizing a character area in an image may further include: a deleting unit 506, configured for removing outlines having a longitudinal height greater than a fourth predetermined threshold from the outlines based on longitudinal coordinate information of the outlines.

Figure 6:
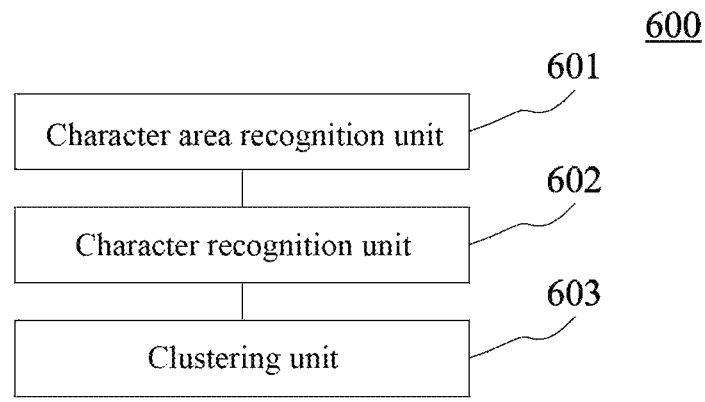
FIG. 6 is a schematic structural diagram of an embodiment of an apparatus for recognizing a character in an image according to the disclosure.

Further reference is made to FIG. 6. As an implementation of the method shown in the above figures, the disclosure provides an embodiment of an apparatus for recognizing a character in an image. The embodiment of the apparatus corresponds to the embodiment of the method shown in FIG. 4. The apparatus may be specifically applied to a variety of electronic devices.

As shown in FIG. 6, an apparatus 600 for recognizing a character in an image according to the embodiment includes: a character area recognition unit 601, a character recognition unit 602, and a clustering unit 603. The character area recognition unit 601 includes the apparatus for recognizing a character area in an image according to any one of claims 7 to 11; the character area recognition unit 602 is configured for recognizing characters in recognized character areas in a to-be-recognized image respectively, to obtain character recognition results; and the aggregation unit 603 is configured for aggregating the obtained character recognition results.

Relevant descriptions on the steps 401 and 402 in the embodiment corresponding to FIG. 4 may be respectively referred to for specific processing of the character area recognition unit 601, the character recognition unit 602, and the clustering unit 603 of the apparatus 600 for recognizing a character in an image according to the embodiment, which are not repeated any more here.

Figure 7:
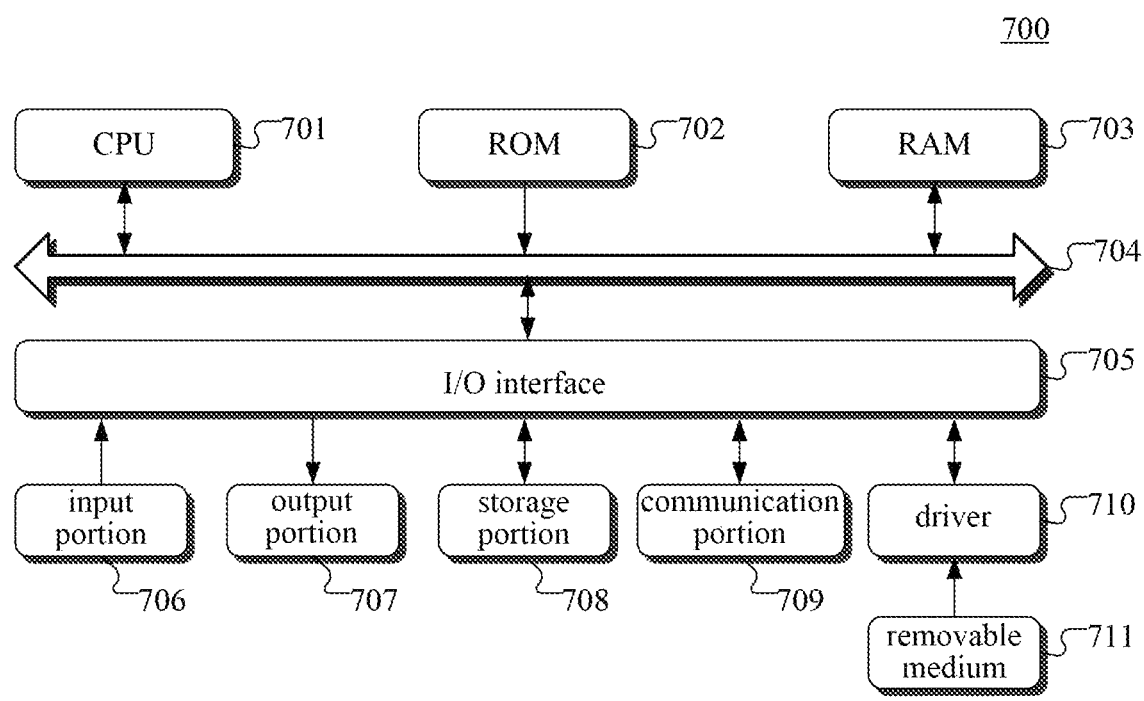
FIG. 7 is a schematic structural diagram of a computer system adapted to implement an electronic device according to an embodiment of the disclosure.

Referring to FIG. 7, a schematic structural diagram of a computer system 700 adapted to implement an electronic device of the embodiments of the present disclosure is shown.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 including a cathode ray tube (CRT), a liquid crystal display device (LCD), a speaker etc.; a storage portion 708 including a hard disk and the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instruction.

The units involved in the embodiments of the present disclosure may be implemented by means of software or hardware. The described units may also be provided in a processor, for example, described as: a processor, including an acquisition unit, a clustering unit, an outline determining unit, a character area generation unit, where the names of these units do not in some cases constitute a limitation to such units themselves. For example, the acquisition unit may also be described as "a unit for acquiring a to-be-recognized image."

In another aspect, the present disclosure further provides a non-volatile computer storage medium. The non-volatile computer storage medium may be the non-volatile computer storage medium included in the apparatus in the above described embodiments, or a stand-alone non-volatile computer storage medium not assembled into the apparatus. The non-volatile computer storage medium stores one or more programs. The one or more programs, when executed by a device, cause the device to: acquiring color values and position information of pixel points in a to-be-recognized image; clustering the pixel points based on the color values of the pixel points, the color values of the pixel points in each pixel point category being identical or similar; determining, for each category of clustered pixel points, outlines of connected regions including the pixel points in the each category of pixel points, to obtain an outline set; and merging, based on the color values and the position information of the outlines in the outline set, the outlines, to obtain character areas in the image.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for recognizing a character area in an image, the method comprising:
   acquiring color values and position information of pixel points in a to-be-recognized image;
   clustering the pixel points based on the color values of the pixel points, the color values of the pixel points in each category of the clustered pixel points being, identical or similar;
   determining, for each category of the clustered pixel points, outlines of connected regions including the pixel points in the each category, to obtain an outline set; and
   merging, based on the color values and position information of the outlines in the outline set, the outlines, to obtain character areas in the image, wherein the position information comprises a horizontal coordinate and a longitudinal coordinate; and
   the merging, based on the color values and the position information of the outlines in the outline set, the outlines, to obtain character areas in the image comprises;
   merging, for the outlines in a given line, outlines having identical or similar color values and a first horizontal distance therebetween smaller than or equal to a first predetermined threshold, to obtain a set of character lines; and
   merging, for the character lines in the set, the character lines in the set based on the color values, longitudinal coordinates, and horizontal coordinates of the character lines in the set, to obtain the character areas in the image, wherein the merging, for the character lines in the set, the character lines in the set based on the color values, longitudinal coordinates, and horizontal coordinates of the character lines in the set, to obtain the character areas in the image comprises:
   calculating a longitudinal distance between longitudinally adjacent character lines and a second horizontal distance between minimum horizontal coordinates of the adjacent character lines; and
   merging character lines having identical color values, the longitudinal distance smaller than or equal to a second predetermined threshold, and the second horizontal distance smaller than or equal to a third predetermined threshold, to obtain the character areas in the image.

2. The method according to claim 1, further comprising:
   determining circumscribed rectangles of the outlines, color values of the circumscirbed rectangles being color values of corresponding outlines, the position information of the circumscirbed rectangle being vertex coordinates of four sides of the corresponding outline; and
   the merging, based on the color values and the position information of the outlines in the outline set, the outlines, to obtain character areas in the image comprises:
   merging, based on the color values and position information of the circumscirbed rectangles of the outlines, the circumscirbed rectangles, to obtain the character areas in the image.

3. The method according to claim 1, wherein before the merging, based on the color values and the position information of the outlines in the outline set, the outlines, to obtain character areas in the image, the method further comprises:
   removing outlines having a longitudinal height greater than a fourth predetermined threshold from the outlines based on longitudinal coordinate information of the outlines.

4. The method according to claim 1, further comprising:
   recognizing characters in the recognized character areas in the to-be-recognized image respectively, to obtain character recognition results; and
   aggregating the obtained character recognition results.

5. An apparatus for recognizing a character area in an image, the apparatus comprising:

at least one processor; and a memory storing instructions, wherein the instructions when executed by the at least one processor, cause the at least one processor to perform operations, the operations comprising:

acquiring color values and position information of pixel points in a to-be-recognized image;

clustering the pixel points based on the color values of the pixel points, the color values of the pixel points in each category of the clustered pixel points being identical or similar;

determining, for each category of the clustered pixel points, outlines of connected regions including the pixel points in the each category, to obtain an outline set; and merging, based on the color values and position information of the outlines in the outline set, the outlines, to obtain character areas in the image, wherein the position information comprises a horizontal coordinate and a longitudinal coordinate; and the merging, based on the color values and the position information of the outlines in the outline set, the outlines, to obtain character areas in the image comprises:

merging, for the outlines in a given line, outlines having identical or similar color values and a first horizontal distance therebetween smaller than or equal to a first predetermined threshold, to obtain a set of character lines; and merging, for the character lines in the set, the character lines in the set based on the color values, longitudinal coordinates, and horizontal coordinates of the character lines in the set, to obtain the character areas in the image, wherein the merging, for the character lines in the set, the character lines in the set based on the color values, longitudinal coordinates, and horizontal coordinates of the character lines in the set, to obtain the character areas in the image comprises:

calculating a longitudinal distance between longitudinally adjacent character lines and a second horizontal distance between minimum horizontal coordinates of the adjacent character lines; and merging character lines having identical color values, the longitudinal distance smaller than or equal to a second predetermined threshold, and the second horizontal distance smaller than or equal to a third predetermined threshold, to obtain the character areas in the image.

6. The apparatus according to claim 5, wherein the operations further comprise:

determining circumscirbed rectangles of the outlines, color values of the circumscirbed rectangles being the color values of corresponding outlines, the position information of the circumscribed rectangle being vertex coordinates of four sides of the corresponding outline; and the merging, based on the color values and the position information of the outlines in the outline set, the outlines, to obtain character areas in the image comprises:

merging, based on the color values and the position information of the circumscirbed rectangles of the outlines, the circumscirbed rectangles, to obtain the character areas in the image.

7. The apparatus according to claim 5, wherein the operations further comprise:

removing outlines having a longitudinal height greater than a fourth predetermined threshold from the outlines based on longitudinal coordinate information of the outlines.

8. The apparatus according to claim 5, wherein the operations further comprise:

recognizing characters in the recognized character areas in the to-be-recognized image respectively, to obtain character recognition results; and aggregating the obtained character recognition results.

9. A non-transitory non-volatile computer storage medium, the computer storage medium storing computer readable instructions executable by a processor, the computer readable instructions, when executed by the processor, cause the processor to perform operations, the operations comprising:

acquiring color values and position information of pixel points in a to-be-recognized image;

clustering the pixel points based on the color values of the pixel points, the color values of the pixel points in each category of the clustered pixel points being identical or similar;

determining, for each category of the clustered pixel points, outlines of connected regions including the pixel points in the each category, to obtain an outline set; and merging, based on the color values and position information of the outlines in the outline set, the outlines, to obtain character areas in the image, wherein the position information comprises a horizontal coordinate and a longitudinal coordinate; and the merging, based on the color values and the position information of the outlines in the outline set, the outlines, to obtain character areas in the image comprises;

merging, for the outlines in a given line, outlines having identical or similar color values and a first horizontal distance therebetween smaller than or equal to a first predetermined threshold, to obtain a set of character lines; and merging, for the character lines in the set, the character lines in the set based on the color values, longitudinal coordinates, and horizontal coordinates of the character lines in the set, to obtain the character areas in the image, wherein the merging, for the character lines in the set, the character lines in the set based on the color values, longitudinal coordinates, and horizontal coordinates of the character lines in the set, to obtain the character areas in the image comprises:

calculating a longitudinal distance between longitudinally adjacent character lines and a second horizontal distance between minimum horizontal coordinates of the adjacent character lines; and merging character lines having identical color values, the longitudinal distance smaller than or equal to a second predetermined threshold, and the second horizontal distance smaller than or equal to a third predetermined threshold, to obtain the character areas in the image.

* * * * *